United States Patent
Hämäläinen et al.

(10) Patent No.: US 6,470,024 B1
(45) Date of Patent: Oct. 22, 2002

(54) METHOD AND APPARATUS FOR CONTROLLING THE USE OF IDLE FRAMES

(75) Inventors: Jari Hämäläinen, Kangasala As.; Jarkko Oksala, Tampere, both of (FI)

(73) Assignee: Nokia Mobile Phones Limited, Espoo (FI)

(*) Notice: Subject to any disclaimer, the term of this patent is extended or adjusted under 35 U.S.C. 154(b) by 0 days.

(21) Appl. No.: 09/301,244

(22) Filed: Apr. 28, 1999

(30) Foreign Application Priority Data

Apr. 30, 1998 (FI) .................................. 980969

(51) Int. Cl.$^7$ ............................................ H04L 12/43
(52) U.S. Cl. ................... 370/459; 370/442; 455/512; 455/509
(58) Field of Search .......................... 370/252, 437, 370/442, 447, 458, 459, 512, 528; 455/450, 451, 452, 453, 509

(56) References Cited

U.S. PATENT DOCUMENTS

| | | | |
|---|---|---|---|
| 5,214,687 A | 5/1993 | Kansakoski et al. .......... 379/60 |
| 5,257,257 A | 10/1993 | Chen et al. .................... 370/18 |
| 5,276,691 A | 1/1994 | Kivari ........................ 371/47.1 |
| 5,345,448 A | 9/1994 | Keskitalo ................... 370/95.3 |
| 5,410,733 A | 4/1995 | Niva et al. .................. 455/33.2 |
| 5,483,668 A | 1/1996 | Malkamaki et al. ....... 455/33.2 |
| 5,524,009 A | 6/1996 | Tuutijarvi et al. .......... 370/95.3 |
| 5,572,510 A | * 11/1996 | Koivu ......................... 370/252 |
| 5,633,874 A | 5/1997 | Diachina et al. ............ 370/329 |
| 5,640,395 A | 6/1997 | Hamalainen et al. ...... 370/322 |
| 5,659,598 A | 8/1997 | Byrne et al. ................. 455/436 |
| 5,703,873 A | 12/1997 | Ojanpera et al. ........... 370/332 |
| 5,710,974 A | 1/1998 | Granlund et al. .......... 455/33.2 |
| 5,715,426 A | 2/1998 | Takahashi et al. .......... 395/455 |
| 5,726,981 A | 3/1998 | Ylitervo et al. ............. 370/332 |
| 5,729,534 A | 3/1998 | Jokinen et al. ............. 370/280 |
| 5,729,541 A | 3/1998 | Hamalainen et al. ...... 370/337 |
| 5,732,073 A | 3/1998 | Kusaki et al. .............. 370/280 |
| 5,764,632 A | 6/1998 | Ylitervo ...................... 370/337 |
| 5,774,809 A | 6/1998 | Tuutijarvi et al. .......... 455/437 |
| 5,790,534 A | 8/1998 | Kokko et al. ............... 370/335 |
| 5,802,465 A | 9/1998 | Hamalainen et al. ....... 455/403 |
| 5,809,399 A | 9/1998 | Tuutijarvi et al. ............ 455/63 |
| 5,815,801 A | 9/1998 | Hamalainen et al. ......... 455/63 |
| 5,838,672 A | 11/1998 | Rantz .......................... 370/335 |
| 5,845,192 A | 12/1998 | Saunders ................... 455/11.1 |
| 5,864,759 A | 1/1999 | Tat .............................. 455/437 |
| 5,870,675 A | 2/1999 | Tuutijarvi et al. .......... 455/436 |
| 6,002,919 A | * 12/1999 | Posti .......................... 455/67.1 |
| 6,327,469 B1 | * 12/2001 | Gaastra ...................... 455/436 |

FOREIGN PATENT DOCUMENTS

| | | | | |
|---|---|---|---|---|
| EP | 0954189 A2 | * 11/1999 | ............ H04Q/7/22 |
| EP | 1005243 A1 | * 5/2000 | ............ H04Q/7/38 |

OTHER PUBLICATIONS

"Digital cellular telecommunications system (Phase 2+); General Packet Radio Service (GPRS); Overall description of the GPRS radio interface; Stage 2" GSM 03.64 version 5.2.0) (Jan. 1998).

* cited by examiner

Primary Examiner—Ricky Ngo
Assistant Examiner—Tri H. Phan
(74) Attorney, Agent, or Firm—Perman & Green, LLP (57) ABSTRACT

A method and apparatus implementing the method for controlling the use of idle frames by a mobile station operating in a wireless telecommunication network. A control unit of the mobile station comprises the information on activities that can be carried out during idle frames in accordance with the mobile station's operating mode. At each idle frame, the mobile station checks said operating mode and activities to be carried out and of the activities to be carried out, determines the one that has the highest priority on the basis of said operating mode. For example, if necessary, the number of idle frames used for synchronisation burst search can be arranged as high as possible and, thus, enhance synchronisation.

8 Claims, 7 Drawing Sheets

52-multiframe No. n:
uplink         TAI=0                                               TAI=1

| B0 | B1 | B2 | 0 | B3 | B4 | B5 | 1 | B6 | B7 | B8 | 2 | B9 | B10 | B11 | 3 | downlink         TA_message 1                                    TA_message 1

52-multiframe No. n+1:
uplink         TAI=2                                               TAI=3

| B0 | B1 | B2 | 4 | B3 | B4 | B5 | 5 | B6 | B7 | B8 | 6 | B9 | B10 | B11 | 7 | downlink         TA_message 1                                    TA_message 1

52-multiframe No. n+2:
uplink         TAI=4                                               TAI=5

| B0 | B1 | B2 | 8 | B3 | B4 | B5 | 9 | B6 | B7 | B8 | 10 | B9 | B10 | B11 | 11 | downlink         TA_message 2                                    TA_message 2

52-multiframe No. n+3:
uplink         TAI=6                                               TAI=7

| B0 | B1 | B2 | 12 | B3 | B4 | B5 | 13 | B6 | B7 | B8 | 14 | B9 | B10 | B11 | 15 | downlink         TA_message 2                                    TA_message 2

52-multiframe No. n+4:
uplink         TAI=8                                               TAI=9

| B0 | B1 | B2 | 16 | B3 | B4 | B5 | 17 | B6 | B7 | B8 | 18 | B9 | B10 | B11 | 19 | downlink         TA_message 3                                    TA_message 3

52-multiframe No. n+5:
uplink         TAI=10                                          TAI=11

| B0 | B1 | B2 | 20 | B3 | B4 | B5 | 21 | B6 | B7 | B8 | 22 | B9 | B10 | B11 | 23 | downlink         TA_message 3                                    TA_message 3

52-multiframe No. n+6:
uplink         TAI=12                                          TAI=13

| B0 | B1 | B2 | 24 | B3 | B4 | B5 | 25 | B6 | B7 | B8 | 26 | B9 | B10 | B11 | 27 | downlink         TA_message 4                                    TA_message 4

52-multiframe No. n+7:
uplink         TAI=14                                          TAI=15

| B0 | B1 | B2 | 28 | B3 | B4 | B5 | 29 | B6 | B7 | B8 | 30 | B9 | B10 | B11 | 31 | downlink         TA_message 4                                    TA_message 4

METHOD AND APPARATUS FOR CONTROLLING THE USE OF IDLE FRAMES

The present invention relates to a method and apparatus implementing the method for controlling the use of idle frames by a mobile station operating in a wireless telecommunications network. In the method, data transmission based on time division multiple access is divided into frames containing a fixed number of timeslots, and the frames are divided into timeslots containing bursts between the mobile station and a base transceiver station. The selected number of successive frames form the mobile station's multiframe comprising traffic frames substantially intended for the transmission of traffic data, as well as idle frames intended for activities relating to the measurements of the radio path between the mobile station and a base station subsystem and the transfer of the measurement results.

Originally, digital cellular network systems have used circuit switched data transmission, whereupon a permanent transmission medium is provided for the time of the connection between the terminal equipments. Indeed, the data flow relating to speech transmission is reasonably continuous, whereupon circuit switched data transmission is normally effective enough as regards the utilisation of the radio resource. However, the data flow relating to data calls is typically bursty, in which case radio path is unnecessarily wasted on long-term reservation of timeslots for circuit switched data transmission.

Since it can be foreseen that the demand for data services in digital cellular network systems is growing rapidly, the European Telecommunications Standards Institute (ETSI) has launched preparations for standardising a new, GSM-based (Global System for Mobile Communications) packet switched data transmission service. The new service is known as the General Packet Radio Service (GPRS), and it has been developed to operate together with the traditional circuit switched GSM data transmission so that the radio path can effectively be utilised in connection with both data and speech transmission.

In the GSM system, communication between a mobile station (MS) and a base station subsystem (BSS) is implemented by transmitting data through a radio channel, the radio channel being made up of the timeslots reserved for the connection of the used radio frequency band. The GPRS provides an opportunity to dynamically adapt the capacity so that timeslots are only reserved for the connection when there is data to be transmitted, and the timeslots for data transmission directed from the mobile station to the base transceiver station and from the base transceiver station to the mobile station are defined separately. When data should be transmitted, the transmission of the data is faster due to the high capacity, and when there is no data to be transmitted, the capacity can be used for the needs of other connections.

The advantage of packet switched data transmission is substantially realised when a data transmission connection can be established quickly. If the establishment of a connection for transmitting a data packet is slow, a GPRS-type service for transmitting small-sized data packets is not justified. In order to quickly establish a connection in the GPRS system between the mobile station MS and a serving GPRS access point, a kind of virtual connection is established, in which case data transmission can be launched quickly if necessary without having to create or transmit all the data required for the establishment of the connection. For an optimum establishment and maintenance of said virtual connections, the mobile station should be able to continuously receive data from surrounding cells when transferring from one access point to another. This presupposes a kind of presynchronisation with the surrounding cells so that it is possible to transmit and receive the required cell data. The rate at which the mobile station is capable of being connected to a cell affects the establishment of the connection and, thus, the efficiency of the whole packet switched data transmission. Particularly in an urban environment, where there are a lot of surrounding cells and the mobile station has to monitor its environment at a rapid pace, it is important that the synchronisation is as fast as possible.

The intention of the present invention is to provide a method and apparatus implementing the method for enabling efficient utilisation of idle frames in wireless packet switched data transmission.

In a method, according to the invention, time division multiple access-based data transmission is divided into frames containing a fixed number of timeslots, and the frames are divided into timeslots containing bursts between a mobile station and a base transceiver station, and the selected number of successive frames form the mobile station's multiframe, which comprises traffic frames substantially intended for the transmission of traffic data, as well as idle frames intended for activities relating to the measurements of the radio path between the mobile station and a base station subsystem and the transmission of the measurement results. It is characteristic of the method that the activities relating to the measurements of the radio path and the transmission of the measurement results, which can be carried out during an idle frame, as well as the operating mode of the mobile station are checked by the mobile station; the priority between the activities is determined according to the mobile station's operating mode; and the operation having the highest priority is carried out by the mobile station during the idle frame.

Another objective of the invention is a mobile station, according to claim 5, for a wireless telecommunications system, wherein data transmission based on time division multiple access is divided into frames containing a fixed number of timeslots, and the frames are divided into timeslots containing bursts between the mobile station and a base transceiver station, and the selected number of successive frames form the mobile station's multiframe, which comprises traffic frames substantially intended for the transmission of traffic data, as well as idle frames intended for activities relating to the measurements of the radio path between the mobile station and a base station subsystem and the transmission of the measurement results. It is characteristic of the method that the mobile station comprises means for checking the activities relating to the measurements of the radio path and the transmission of the measurement results, which can be carried out during an idle frame; for defining the mobile station's operating mode; for defining the priority between the activities according to the mobile station's operating mode; and for launching, during the idle frame, the operation having the highest priority.

The invention is based on the idea that the mobile station's control unit comprises information about the activities that can be carried out during an idle frame according to the mobile station's operating mode. At each idle frame, the mobile station checks said operating mode and the activities to be carried out and, from the activities to be carried out, determines the one having the highest priority on the basis of said operating mode. In a solution according to the invention, e.g. the number of idle frames used for searching for a synchronisation burst sent from a base station subsystem can be arranged by the mobile station as high as possible, whereby the probability that the timing burst and the mobile station's said idle frame intended for the searching of the burst are synchronous is as high as possible.

In the following, the present invention will be discussed in detail by referring to the enclosed drawings, in which.

Figure 1:
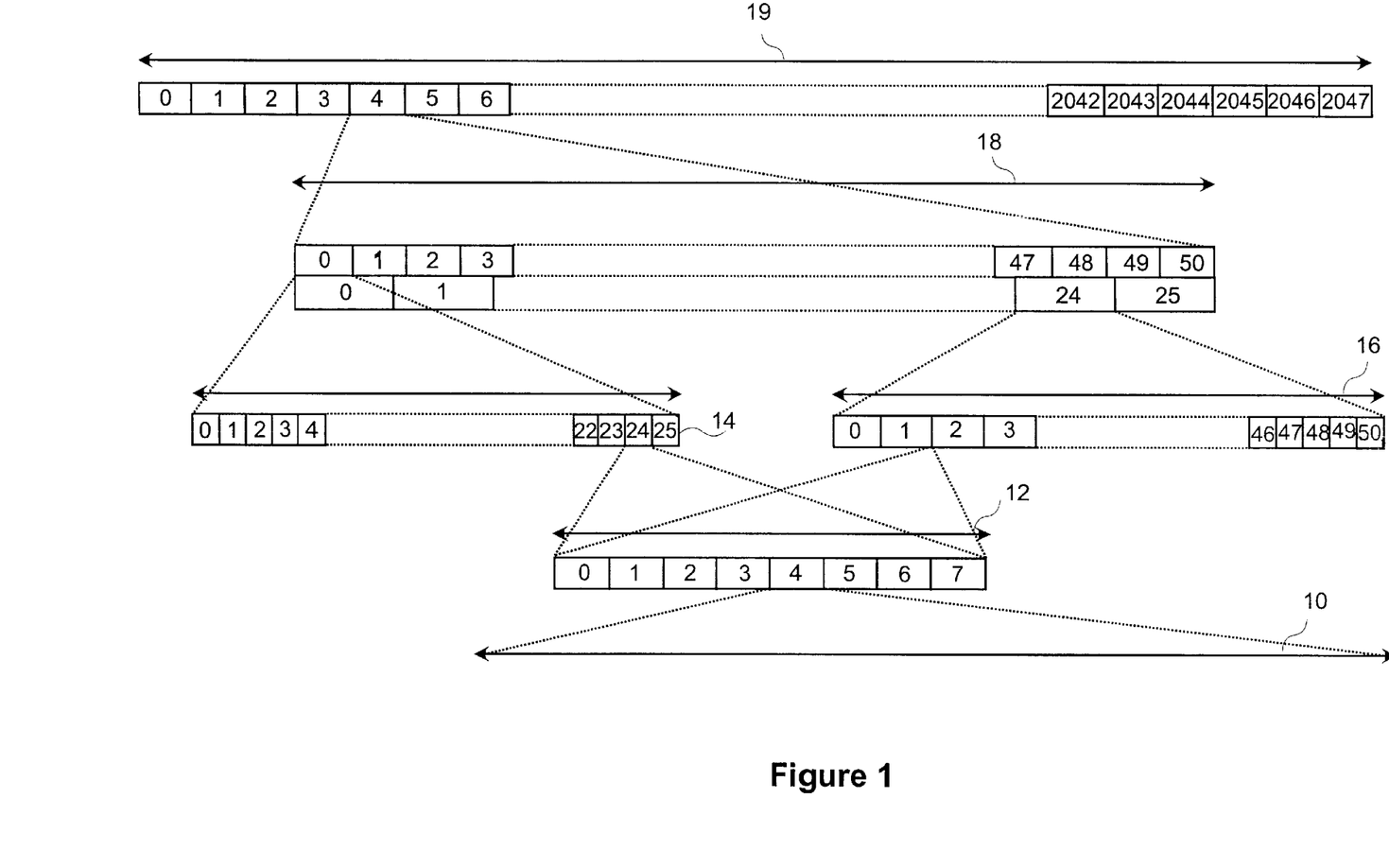
FIG. 1 is a diagram illustrating time division multiple access (TDMA) according to prior art.

The GPRS system complies with time division multiple access (TDMA) according to the GSM system, the principle of which is illustrated in FIG. 1. Different kinds of bursts of fixed duration are transmitted over the radio path, the bursts being channelled in the transmission phase into a 15/26-millisecond long timeslot 10. Each carrier may comprise eight physical channels, in which case a TDMA frame 12 is made up of eight timeslots 10 and a physical channel is basically made up of a continuum of one timeslot (modulo 8) in a series of successive TDMA frames. For the transmission of different types of logical channels, the TDMA frames are combined to make two multiframes of a different type: a 120-millisecond long multiframe 14, containing 26 TDMA frames, mainly intended for the transmission of traffic channels and a 3060/13-millisecond long multiframe 16, containing 51 TDMA frames, mainly relating to the transmission of signalling channels. The smallest common multiple of these multiframes is a superframe 18 containing 26×51=1326 TDMA frames. In the multiple access structure presented above, the longest periodic timeslot is a hyperframe 19, which is made up of 2048 superframes. The TDMA frames are numbered in relation to this frame (modulo 8×26×51×2048=2715648) and, therefore, at least the hyperframe contains all possible channel types.

To be able to communicate with one another, the functions of a mobile station MS and a base transceiver station (BTS) of a cellular network should be synchronous. A broadcast channel is arranged for base transceiver stations through which the base transceiver station sends selected base transceiver station data at fixed intervals (23 octets at 0.235-second intervals). On the basis of the data received from the base transceiver station's broadcast channel, mobile stations can be synchronized with the base transceiver station and if necessary, correct their frequency level to correspond with that of the base transceiver station. The mobile station should all the time be listening to the data transmitted by adjacent cells. However, this presupposes a kind of presynchronisation with the adjacent cells so that the mobile station would be capable of decoding the required cell data from the data sent by the base transceiver station. To enable the monitoring of the adjacent cells, the base station subsystem transmits to the mobile station a list of the base transceiver stations surrounding its location on the basis of which the mobile station knows, among other things, the beacon frequency of the surrounding cells. From these base transceiver stations, the mobile station aims at searching for a frequency correction burst so that it can then receive a synchronisation burst after the demodulation of which the mobile station will find out the timing of each base transceiver station.

According to the GSM channel structure, a synchronisation burst (SB) always follows a frequency correction burst (FEB) at the same frequency and in the same timeslot during the following TDMA frame. On the other hand, the FEB has a reasonably easily recognised structure, which corresponds with an unmodulated carrier at a specific frequency shift in relation to a rated baseband (148 bits all having the value of "0"). Due to the selected modulation technique, the signal is a pure sinwave and, therefore, the search for the burst is often called the pure sinwave search (PSW Search). Hence, to find the synchronisation burst SB, the mobile station MS looks for the frequency correction burst FEB in the transmission of the base transceiver station BTS, and after finding it, it is capable of receiving the synchronisation burst that contains more detailed information relating to the timing of the base transceiver station.

Figure 2:
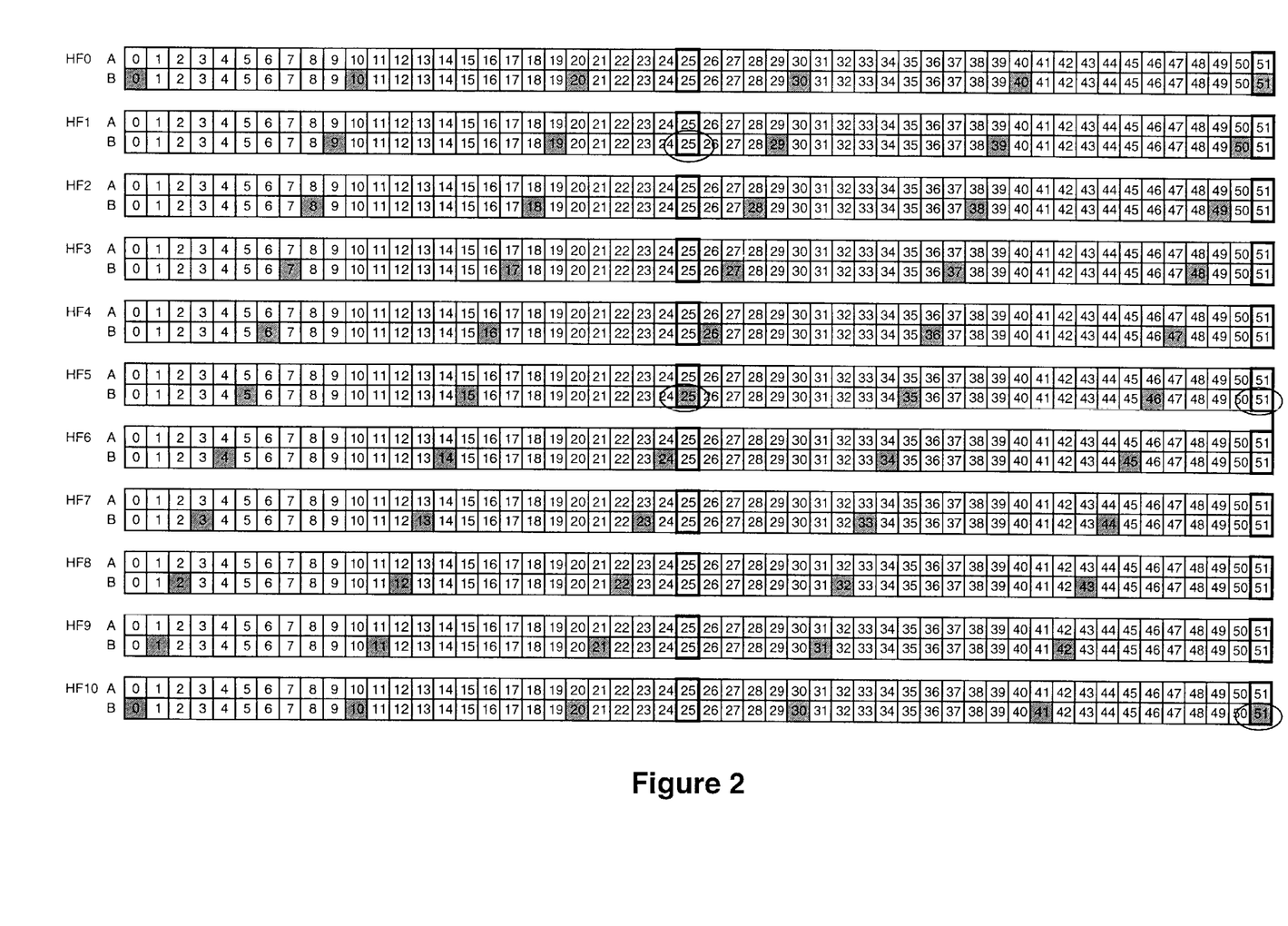
FIG. 2 is a diagram illustrating a frequency correction burst search in an arrangement according to prior art.

FIG. 2 illustrates the implementation of a frequency correction burst search in a time division multiple access structure of the GSM system according to prior art. A multiframe (A0–A25), containing 26 TDMA frames, contains 24 TDMA frames (A0–A11, A13–A24) that contain bursts of traffic channels, one frame (A12) reserved for a SACCH pilot channel, and one idle frame (A25). Typically, during the idle frame, the mobile station neither transmits nor receives and, therefore, it is possible to carry out, e.g. a search for finding a frequency correction burst. A base transceiver station transmits a FCCH channel containing the frequency correction burst within a multiframe containing 51 TDMA frames in such a way that between the first four frames (B0, B10, B20, B30, B40) containing a FCCH channel, there are ten TDMA frames and between the fourth and the fifth (B51), there are eleven TDMA frames.

It can be seen in the figure that the mobile station detects the FEB, sent by the base transceiver station, in an idle frame A51 of a first multiframe HF0. A new search is launched in an idle frame B25 of a second multiframe HF1. The point where the BTS sends a FEB for the second time during the mobile station's idle frame is found in an idle frame A25 of a sixth multiframe HF5, in which case a period of time corresponding to 8*26+1=209 TDMA frames has passed during the search (approx. 0.965 seconds). Correspondingly, when the next search is launched in the idle frame A51 of the sixth multiframe HF5, a point can be found where the BTS does not send a frequency correction burst during the mobile station's idle frame until in the last frame A51 of an eleventh multiframe HF10, whereupon a period of time corresponding to 10*26+1=261 TDMA frames has passed during the search (approx. 1.205 seconds). The speeding up of these searching times accepted in the GSM system has a positive effect on the operation of the GPRS system particularly in an urban operating environment, which is made up of a large number of areally small cells.

Figure 3:
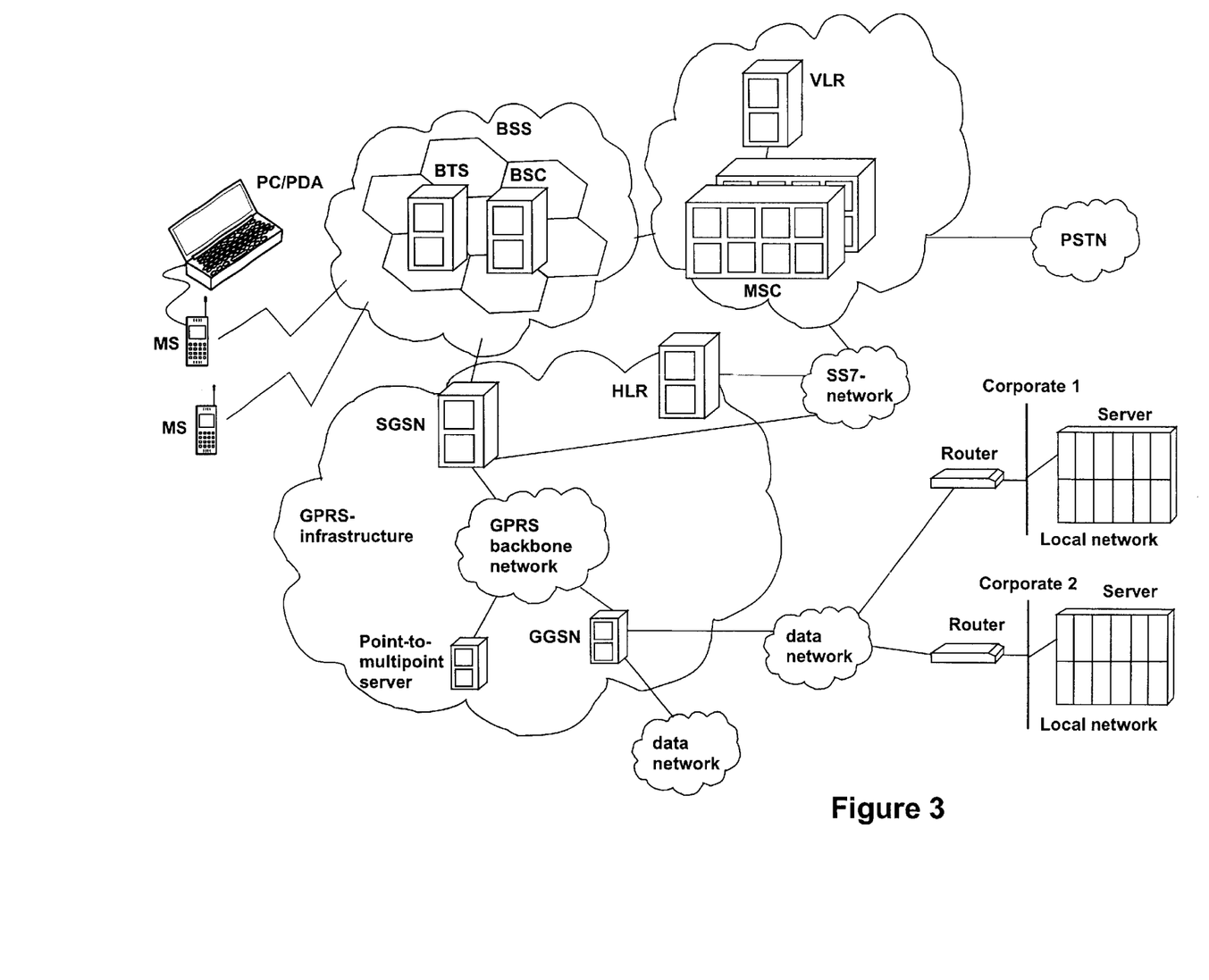
FIG. 3 is a block diagram showing a GSM/GPRS network architecture.

The block diagram in FIG. 3 illustrates the architecture of a GPRS network. Mobile stations MS are in contact with base transceiver stations using the radio path. The base transceiver stations BTS are further in contact with a base station controller BSC, which controls and administers several base transceiver stations. The entity made of several base transceiver stations BTS (typically some dozens of base transceiver stations) and one base station controller controlling them is called a base station subsystem BSS. The base station controller BSC is in contact with a mobile services switching centre (MSC) of mobile stations, which co-ordinates connections to mobile stations by means of a home location register HLR and a visitor location register VLR. Through the mobile services switching centre MSC, a connection can further be established to outside the mobile communication network.

The GPRS is logically implemented in the GSM structure by means of two network elements: a gateway GPRS support node (GGSN) and a serving GPRS support node (SGSN). The GGSN is a node, whereto the data packets addressed to a GPRS subscriber are transmitted on the basis of a packet data protocol address (PDP, e.g. IP or X.25). The GGSN contains the subscribers' routing data on the basis of which the data packets coming from the data network can be routed to the subscriber's access point SGSN of that moment. If necessary, the GGSN can also inquire about the subscriber's location data from the home location register HLR. The GGSN is a first packet data network (PDN) access point in the GSM network supporting the GPRS. The SGSN is an access point serving the mobile station MS. In the GPRS access, the SGSN establishes a functionality corresponding with the administration of mobility to route the data packets in the direction of the mobile station, and a PDP functionality in the direction of the data network to route the data packets towards the GGSN. If necessary, the SGSN can update the mobile station's location data in the visitor location register. The SGSN and the GGSN can be combined in the same physical node or they can be located in different nodes. The SGSN and the GGSN contain IP routing functionality and they can be connected to IP routers.

Figure 4:
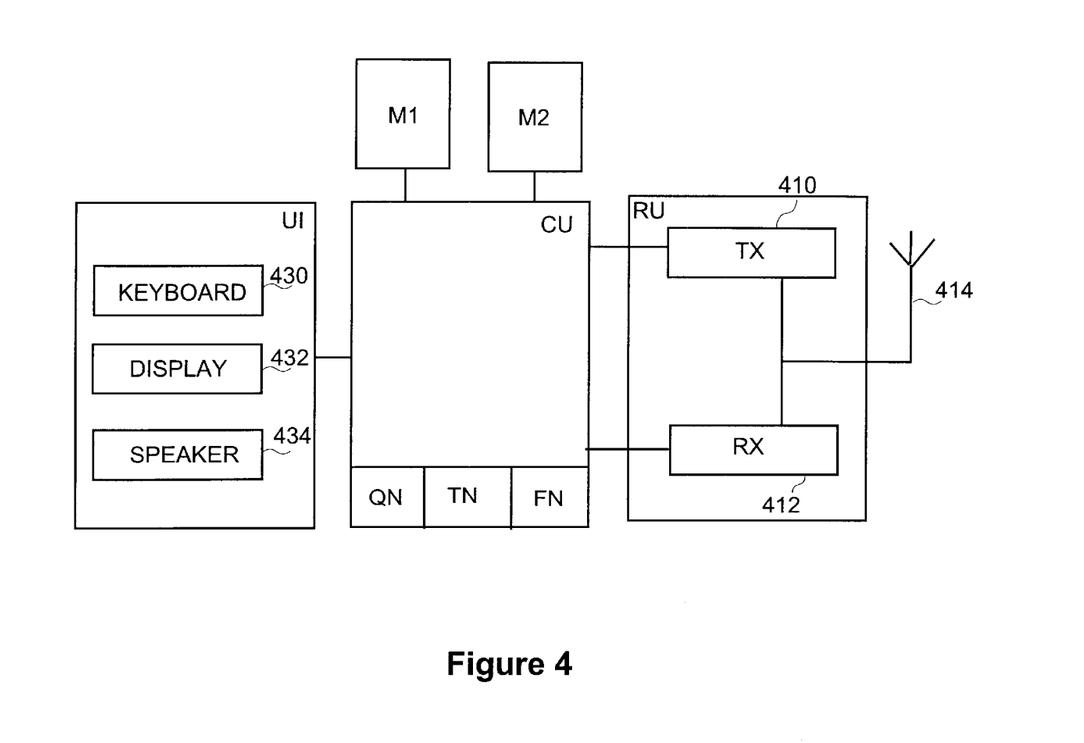
FIG. 4 is a block diagram illustrating a structure of a mobile station supporting GPRS service.

The block diagram in FIG. 4 illustrates a structure of a mobile station, according to the invention, suitable for GPRS. For more detailed operations of the GPRS functions, we refer to the GSM specification 03.64 "Digital cellular telecommunication system, Phase 2+; General Packet Radio Service (GPRS); Overall description of the GPRS radio interface; Stage 2". The mobile station contains a radio unit RU for communication on the radio path, the radio unit comprising a transmitter branch 410 (comprising functional blocks that carry out channel coding, interleaving, modulation and transmission) known from an ordinary mobile station, a receiver branch 412 (comprising functional blocks that carry out reception, demodulation, de-interleaving and channel decoding), as well as an antenna 414.

The main controlling element of the mobile station is a control unit CU, which substantially co-ordinates the functions of all the blocks including the timing of the mobile station's transmission and reception. The present control units typically comprise three different kinds of counters relating to communication between base transceiver stations and the mobile station. A quarter bit number (QN, values 0–624) is set according to the training period contained by the received synchronisation burst. A timeslot number TN (values 0–7) is set to zero in connection with the reception of the synchronisation burst, and the TN increases by one as the counter QN shifts from the value 624 to 0. The value of a TDMA timeslot number FN (values 0–2715647) is read from the synchronisation burst, and the FN increases by one as the counter TN shifts from the value 7 to the value 0. However, neither the number of counters nor their interactive mechanism are essential as regards the invention, and also other alternatives are possible. Typically, the functions of the control circuit are implemented by means of one microprocessor or more.

In the implementation shown in FIG. 4, a first memory M1, which can be a volatile memory, e.g. RAM, wherein the CU stores in-process data, is coupled to the main control unit CU. In addition, the terminal equipment comprises a second memory M2, which preferably is a non-volatile memory, wherein the application programs performing the terminal's different services, other data essential for the operation of the communicator, as well as any other data that should be stored permanently, are stored.

In addition to those mentioned above, the terminal equipment comprises a user interface Ul, which may comprise a display 432, a possible speaker 434 for voice calls, and a keyboard 430.

Figure 5:
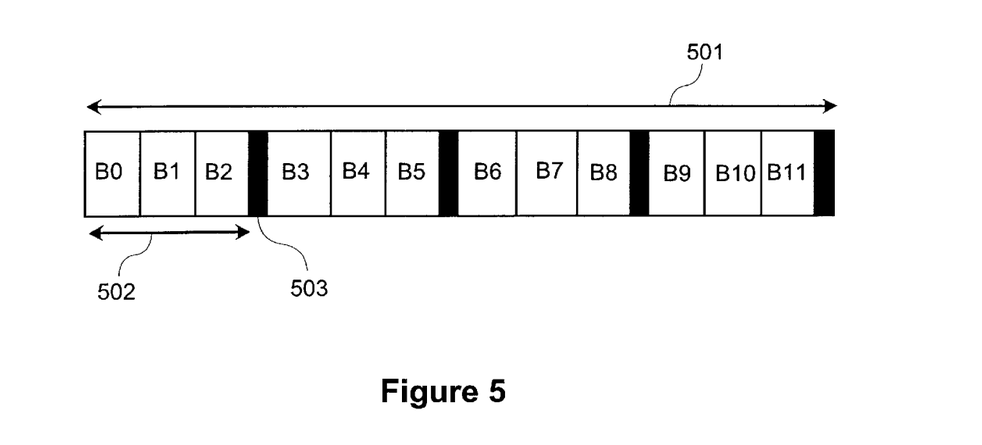
FIG. 5 is a diagram illustrating a frame structure of a GPRS mobile station according to the invention.

In the GPRS system, mobile stations implement time division multiple access, a multiframe 501 of the frame structure of which comprises 52 TDMA frames like the other GSM multiframe. The TDMA frames are divided into radio blocks 502 to be made up of four successive TDMA frames and idle frames 503 remaining in between them as illustrated in FIG. 5. Thus, a single multiframe 501 comprises a total of 12 radio blocks B0–B11 and four idle frames.

According to GPRS specifications, mobile stations should carry out nearly the same measurements relating to the radio path as in the GSM system. Typically, the information on the measurements taken by the mobile station is carried with the data to be transmitted on a packet associated control channel (PACCH) that operates always when necessary, which consequently means the data packets "stolen" from the communication capacity for signalling purposes. These are identified as signalling data by means of the identification bits included in the burst. Thus, the GPRS system does not contain a reservation like the SACCH control frame (A12) shown in FIG. 2. However, search in GPRS specifications, it is recommended that a frequency correction pulse be implemented in every second idle frame in accordance with the GSM system.

For the specification and consideration of a propagation delay, the GPRS specifications present a continuous timing advance procedure for a more detailed description of which, we refer to Point "Continuous timing advance update" (Point 6.5.7.2 in Version 5.2.0) of said GSM specification 03.64. For the definition of a propagation delay, a mobile station communicating with a specific base transceiver station should send an uplink packet timing control channel (PTCCH) random access signal once for every group of eight multiframes. When the mobile station is transferred under a base transceiver station, the base station subsystem informs the mobile station of a timing advance index (TAI), which indicates to the mobile station in which idle frame the mobile station should send said random access signal. On the basis of the random access signal, the base station subsystem computes the timing advance for the mobile station in question and sends a response in a downlink idle frame indicated by the TAI value.

Figure 6:
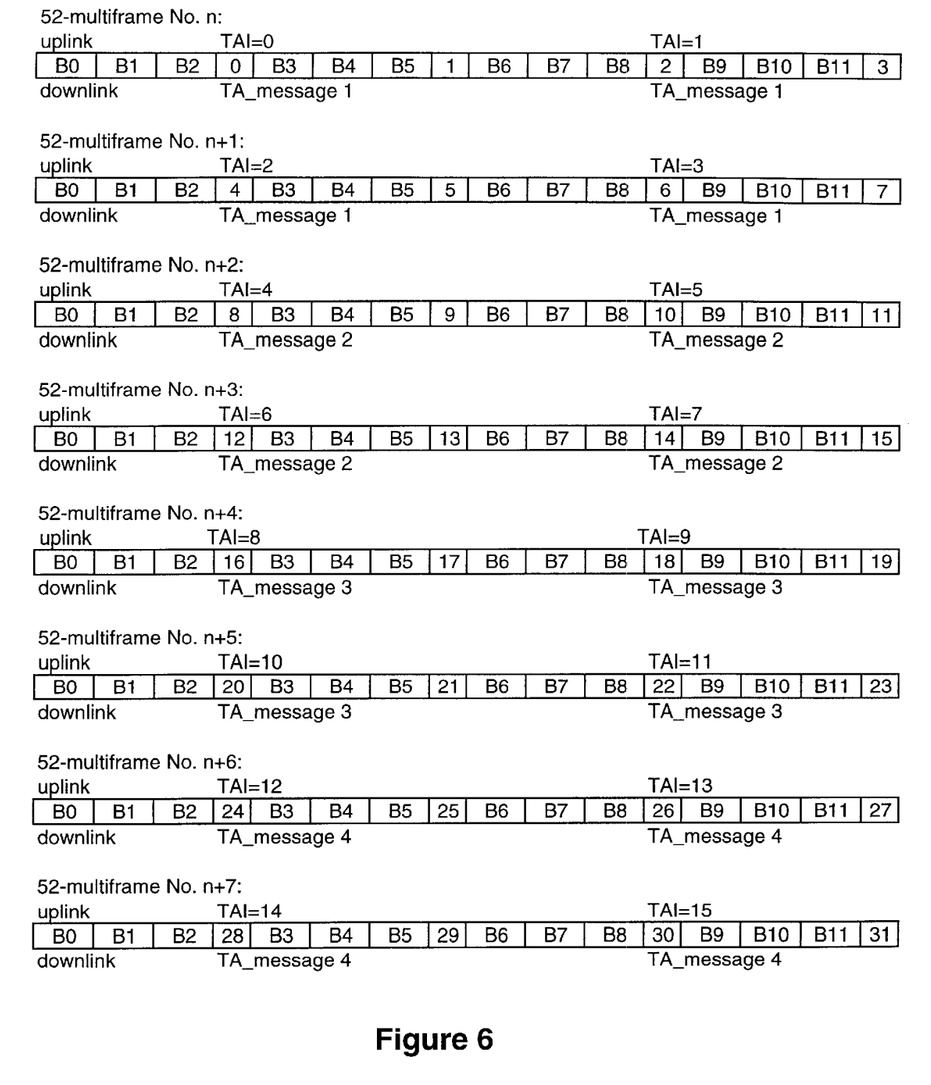
FIG. 6 is a diagram illustrating a method relating the determination of timing advance in a mobile station according to the invention.

The computation of a timing advance has been illustrated by means of the diagram in FIG. 6, the diagram comprising a set of multiframes made up of eight multiframes. Each multiframe comprises 12 radio blocks and 4 idle frames, in accordance with FIG. 5, of which a maximum of every second is used for the definition of the timing advance. In each idle frame, random access signals can be sent (uplink PTCCH) by mobile stations, which have been informed by the base station subsystem of the value of the TAI index marked above the idle frame. The messages wherein the mobile station listens to the timing advance value sent by the network (downlink PTCCH) have been marked below the idle frames. For example, a mobile station that sends a random access message in an idle frame 0, 2, 4 or 6, receives from a base station subsystem an updated timing advance value in a message TA_message_2. The mobile station only has to listen to one downlink PTCCH message and, therefore, of the eight multiframes a maximum of five idle frames belong to the definition of the timing advance.

During idle frames, it is also possible to carry out other activities relating to the mode and operating environment of the mobile station. For example, a GPRS network may comprise base transceiver stations and mobile stations wherein the transmission capacity can be adjusted to eliminate interference visible to receivers. If the network wants to use capacity adjustment in the base transceiver station's transmission to eliminate the effect of a disturbance signal visible to the mobile station, the network orders the mobile station to carry out interference measurements during the idle frames on the basis of which the base transceiver station's transmission capacity can be optimised. In a cell using fixed capacities there is no need to take interference measurements. Correspondingly, e.g. in small cells, the network can order to use a fixed value for the timing advance, in which case it is not necessary to carry out the signalling relating to the measuring of the timing advance. However, the details relating to the taking of the measurements and the transfer of the measurement results are not essential as regards the invention. Basically, it should only be noted that different kinds of activities relating to the mode and operating environment of the mobile station are carried out during the idle frames.

A solution, according to the present invention, makes use of the idea that the number of frames to be allocated for the implementation of the activities relating to the use of said radio paths varies considerably in a mobile station supporting the GPRS, depending on the application and mode. An opportunity to check for each idle frame what kinds of activities should be carried out and what their order of importance is as regards the mobile station's mode and operating environment is added to the control part of a mobile station according to the invention. For example, if there is no other information to be transmitted or if the synchronisation function is chosen to be more important than other data transmission on the basis of the mobile station's mode of that moment, the frequency correction pulse search presented above can be determined to be implemented in all possible idle frames. The synchronisation function can, e.g. be selected to be accelerated in situations, where the mobile station receives from the base station subsystem an updated list of adjacent cells comprising the information about new cells on the timing of which the mobile station has no information.

Figure 7:
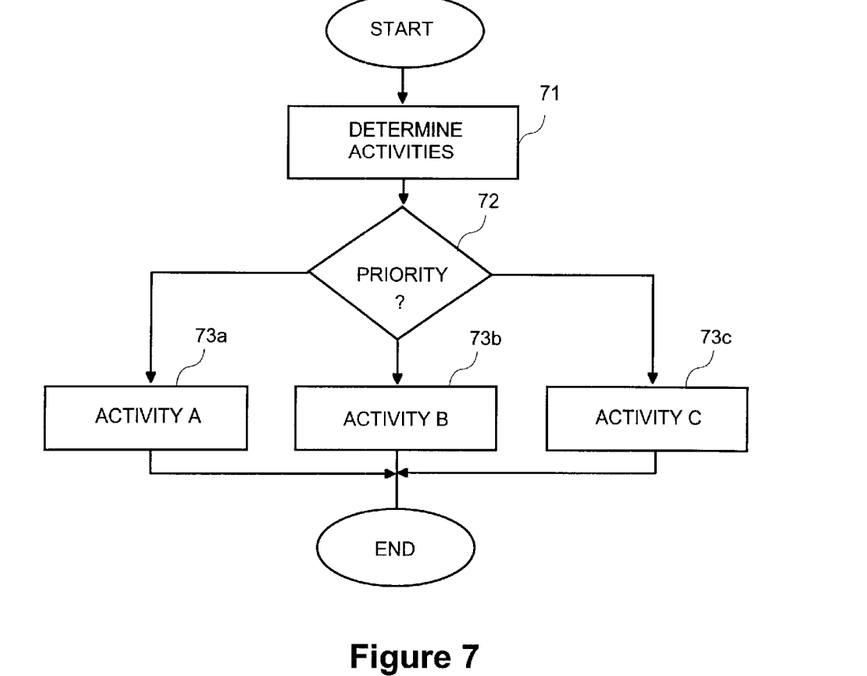
FIG. 7 is a flow diagram illustrating a first embodiment of the method according to the invention.

A decision-making process, according to the first embodiment of the invention, relating to the use of an idle frame, according to the invention, has been illustrated by means of the block diagram in FIG. 7. In Point 71, a control unit checks which activities, to be carried out during the idle frames, a mobile station should carry out during the following idle frame. After finding out the possible activities, the control unit carries out a priority inspection between the possible activities (Point 72) and launches the activity, selected on the basis of the priority inspection, to be carried out during the idle frame (Point 73*a*, 73*b*, 73*c*).

During the priority inspection, the control unit inspects the mobile station's operating mode and, on the basis of the operating mode, selects the activity to be carried out during the idle frame. The operating mode means the selected data relating to the mobile station's operation of that moment and affecting the decision-making process, such as the information on the measuring orders given by the network, the success and necessity of the data transmission relating to the timing advance, the data included in the updated list of cells, etc. Said priority inspection is based on the set of norms determined on the basis of the GPRS specifications and application-specific selections, wherein a mutual priority concerning the possible activities has been connected to the mobile station's selected operating modes.

Figure 8:
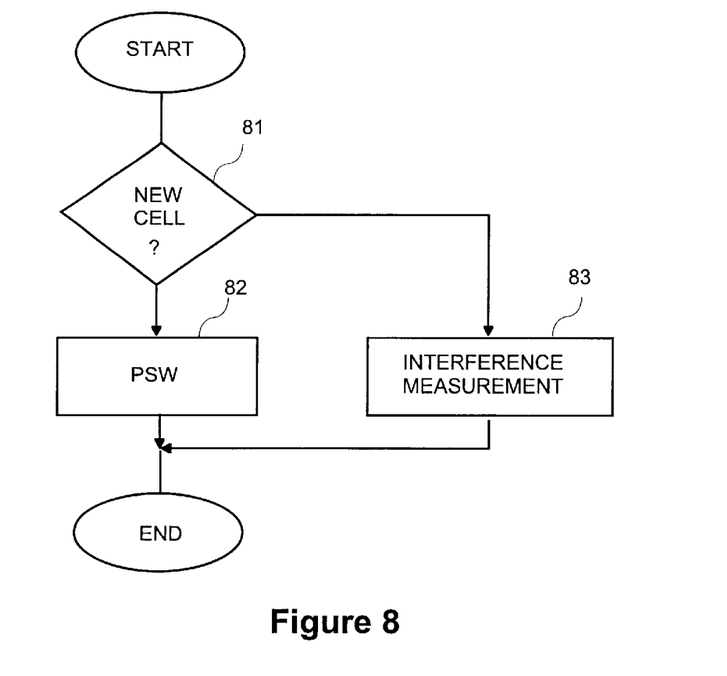
FIG. 8 is a flow diagram illustrating a decision-making process relating to a method according to the invention.

The flow diagram in FIG. 8 illustrates a simple example of such a set of norms in relation to the two activities presented above; the definition of a timing advance and the frequency correction pulse search. At an idle frame, the control unit, according to the invention, has been defined to check whether new cells on the timing of which the mobile station does not have previous information have been included in the updated list of cells received from the base station subsystem (Point 81). If such a new cell is detected, the control unit gives priority to the frequency correction pulse search over the interference measurements ordered by the network (Point 82). Otherwise, the interference measurements are carried out in a normal manner (Point 83).

The example presented above illustrates the whole decision-making process relating to the allocation of idle frames. This is a realistic alternative in connection with a frequency correction pulse search, because the PSW search takes the whole idle frame and it is not possible to carry out other activities during the same idle frame. On the other hand, e.g. a random access message relating to the determination of a timing advance is sent in a specific relation to the limits of the idle frame, which relation is informed by the network in connection with the channel allocation in connection with the TAI value. If the random access message should be sent at the beginning of the idle frame, the remaining timeslots of the idle frame can be used for the measurement of interference values. Correspondingly, if the random access message should be sent at the end of the idle frame, the timeslots of the beginning of the idle frame can be used for the measurement of interference values. Thus, the activity alternatives according to the set of norms presented above can also be made up of a combination of activities that can be carried out during one idle frame. For example, the activity alternatives relating to one idle frame can be: PSW search, interference measurement, transmission of random access message, reception of random access message, interference measurement+random access message transmission in selected timeslots of an idle frame, interference measurement+random access message reception in selected timeslots of the idle frame. The activity to be carried out in an idle frame is selected according to the mobile station's operating mode of that moment.

As presented above, depending on the connection type and operating environment, situations arise in the use of a mobile station, where no data transmission relating to the determination of a timing advance or other use of a radio path is required. In this case, in principle, all idle frames can be utilised for the searching of a frequency correction pulse. Correspondingly, there are situations in the use of a mobile station whereupon the mobile station should at least update the timing advance by transmitting and receiving a PTCCH. In this case, of the 32 idle frames included in the eight multiframes five are used for the updating of the timing advance and 27 can be utilised for the searching of the frequency correction pulse. In some cases, the network may also order the mobile station, for example, to measure interference values at own frequency, whereupon one half of the idle frames must be used for these measurements. However, even in the most unfavourable situation as regards PSW priority, the number of idle frames (16 idle frames out of 32) allocated for a PSW search according to an arrangement according to the present invention corresponds with a situation according to prior art.

Figure 9:
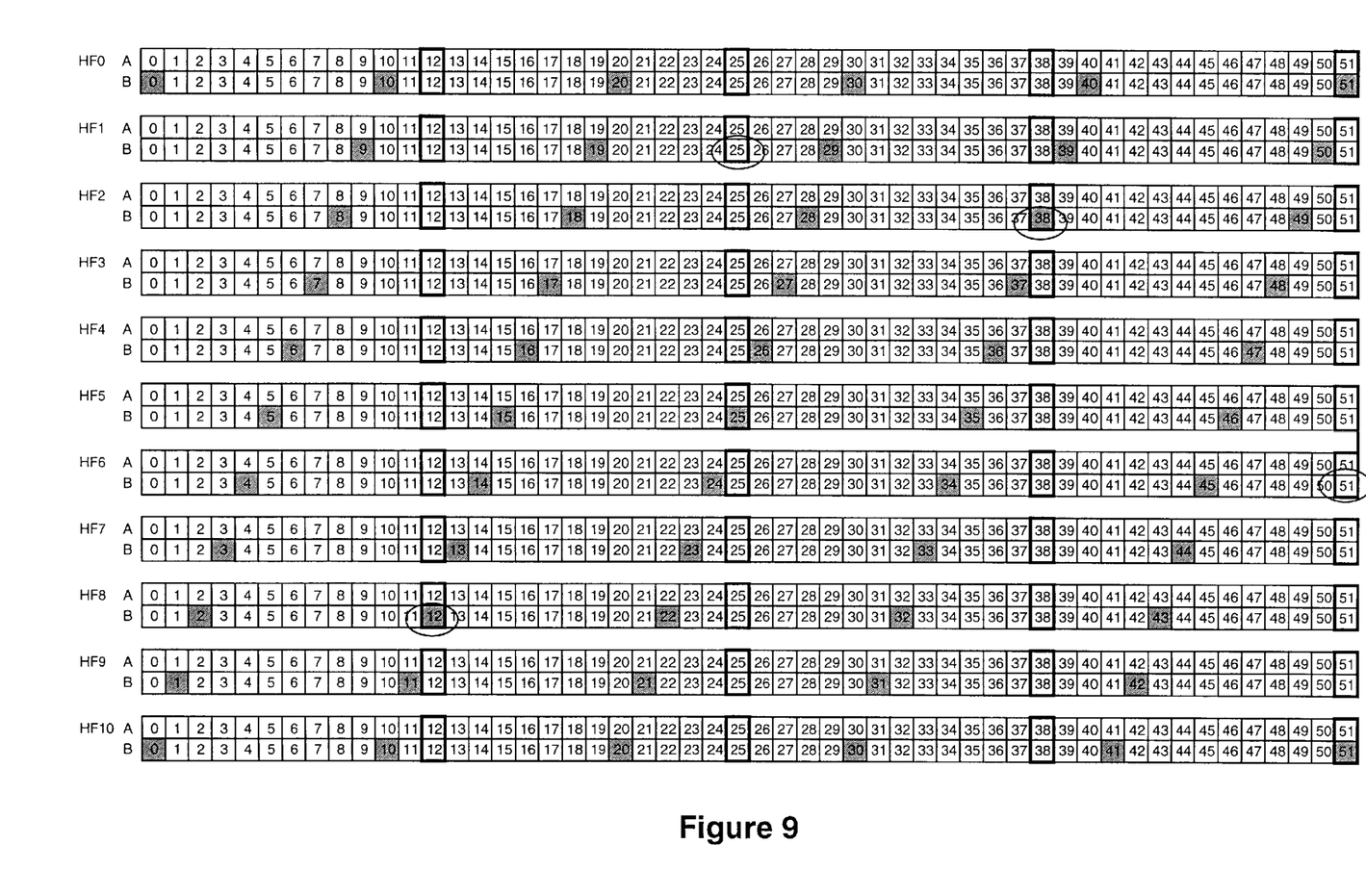
FIG. 9 is a diagram illustrating the utilisation of a solution according to the invention in the searching of a frequency correction signal.

A mobile station's standard operation is made up of a varying combination of situations presented above, i.e. in the idle frames of a mobile station, there will always occasionally occur successive idle frames which are not required to carry out other measurements relating to the radio path. By utilising these in a manner presented above, it is possible to speed up the frequency correction pulse search and, correspondingly, the synchronisation with adjacent cells. The diagram in FIG. 9 illustrates the implementation of a solution according to the invention adapted to a GRPS connection viewed in relation to a PSW search. The presented solution is optimised as regards the PSW search and, therefore, the figure does not take a stand on the implementation of the other measurements to be carried out during idle frames. As in the example illustrated in FIG. 2, the mobile station perceives a FEB, sent by the base transceiver station, in an idle frame A51. A new search is launched in an idle frame B25 of a following multiframe HF1. The point, where the BTS sends the FEB during the mobile station's idle frame is located in an idle frame A38 of a third multiframe HF2, whereupon the search has taken a period of time (approx. 0.305 seconds) corresponding to 5*13+1=66 TDMA frames. Correspondingly, when the PSW search is launched in an idle frame A51 of a sixth multiframe HF5, a point is found where the BTS sends the frequency correction burst during the mobile station's idle frame in a second idle frame A12 of a ninth multiframe HF8, whereupon the search has only taken a period of time corresponding to 9*13+1=118 TDMA frames (approx. 0.545 seconds). The advantage achieved is considerable compared with the times according to FIG. 2.

This paper presents the implementation and embodiments of the present invention with the help of examples. It is obvious to a person skilled in the art that the present invention is not restricted to details of the embodiments presented above, and that the invention can also be implemented in another form without deviating from the characteristics of the invention. The embodiments presented should be considered illustrative, but not restricting. Thus, the possibilities of implementing and using the invention are only restricted by the enclosed patent claims. Consequently, the various options of implementing the invention as determined by the claims, including the equivalent implementations, also belong to the scope of the invention.

What is claimed is:

1. A method for controlling the use of idle frames by a mobile station in a wireless telecommunication network, the method comprising:

dividing data transmission based on time division multiple access into frames containing a fixed number of timeslots, and the frames into timeslots containing bursts between the mobile station and a base transceiver station, wherein a selected number of successive frames form a mobile station's multiframe, which substantially comprises traffic frames intended for the transmission of traffic data, as well as idle frames intended for activities relating to the measurements of a radio path between the mobile station and the base transceiver station and the transmission of the measurement results;

characterised by checking the mobile station activities relating to the measurements of the radio path and the transmission of the measurement results that are to be carried out during an idle frame, as well as the mobile station's operating mode;

determining the priority of the activities in accordance with the mobile station's operating mode;

carrying out the activity having the highest priority during an idle frame by the mobile station.

2. A method according to claim 1, characterised in that said activities comprise at least one of the following: a frequency correction pulse search, transmission and reception of a random access signal relating to the measurement of a timing advance value, interference measurement for power control.

3. A method according to claim 1, characterised in that said activities comprise one of the following combinations that can be carried out during an idle frame:

transmission of a random access signal relating to the measurement of a timing advance value and interference measurement, and reception of a random access signal relating to the measurement of a timing advance value and interference measurement.

4. A method according to claim 1, characterised in that synchronisation bursts containing synchronisation data are transmitted at regular intervals on the base transceiver station's broadcast channel; and the highest priority is set on the frequency correction pulse search in all idle frames, which are not needed to carry out other activities controlled by a base station subsystem.

5. A mobile station (MS) for use in a wireless telecommunication system, wherein data transmission based on time division multiple access is divided into frames containing a fixed number of timeslots, and the frames are divided into timeslots containing bursts between the mobile station and a base transceiver station, and a selected number of successive frames form the mobile station's multiframe, which comprises traffic frames substantially intended for the transmission of traffic data, as well as idle frames intended for activities relating to the measurements of the radio path between the mobile station and a base station subsystem and the transmission of the measurement results;

characterised in that the mobile station comprises means (CU) for checking the activities, relating to the measurements of the radio path and the transmission of the measurement results, which can be carried out during an idle frame;

for determining the mobile station's operating mode;

for determining the priority of the activities in accordance with the mobile station's operating mode; and for launching the activity having the highest priority during an idle frame.

6. A mobile station according to claim 5, characterised in that said activities comprise at least one of the following: frequency correction pulse search, measurement of a timing advance value, interference measurement for power control.

7. A mobile station according to claim 5, characterised in that said activities comprise one of the following combinations that can be carried out during an idle frame: transmission of a random access signal relating to the measurement of a timing advance value and interference measurement, and reception of a random access signal relating to the measurement of a timing advance value and interference measurement.

8. A mobile station according to claim 5, characterised in that said control unit is adapted to set the highest priority on the frequency correction pulse search in all idle frames, which are not needed to carry out other activities controlled by the base station subsystem.

* * * * *

UNITED STATES PATENT AND TRADEMARK OFFICE
CERTIFICATE OF CORRECTION

PATENT NO.    : 6,470,024 B1                                    Page 1 of 1
DATED         : October 22, 2002
INVENTOR(S)   : Hamalainen et al.

It is certified that error appears in the above-identified patent and that said Letters Patent is hereby corrected as shown below:

Column 9,
Lines 60, 63 and 67, "transmission" should read -- transfer --.
Line 65, please delete "characterised by".

Column 10,
Lines 5, 11, 19, 51, 55 and 63, "characterised in that" should read -- wherein --.
Lines 39 and 43, "transmission" should read -- transfer --.
Line 40, please delete "characterised in that".
Line 41, please delete "(CU)".
Lines 46 and 47, please insert the word -- means -- before the word "for".
Line 49, "for launching" should read -- means for carrying out --.

Signed and Sealed this

Fifteenth Day of July, 2003

JAMES E. ROGAN
*Director of the United States Patent and Trademark Office*